United States Patent Office 3,229,205
Patented Jan. 11, 1966

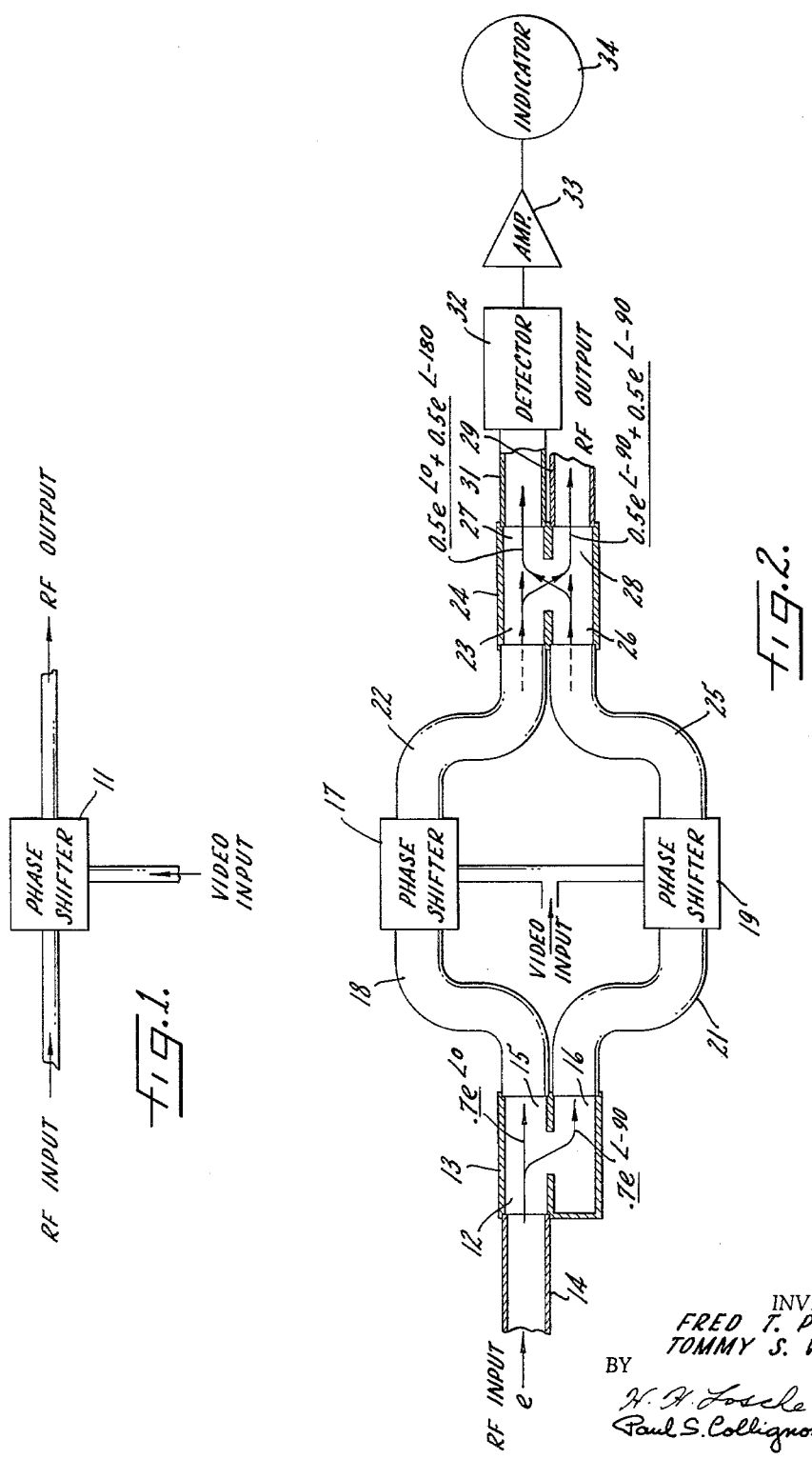

3,229,205
MONITOR DEVICE FOR MICRO-WAVE PHASE SHIFTERS UTILIZING TWO HYBRID COUPLERS
Fred T. Pitts, Rockville, and Tommy S. Weaver, Glen Burnie, Md., assignors, by mesne assignments, to the United States of America as represented by the Secretary of the Navy
Filed July 5, 1963, Ser. No. 293,210
1 Claim. (Cl. 324—84)

The present invention relates to a device for indicating a fault in a radar component and more particularly to a device for monitoring a Doppler phase shifter.

Phase shifters are employed for various purposes in radar components and systems. One use of a phase shifter is in a frequency generator of an airborne radar wherein a Doppler phase shifter is used to introduce phase shifts into an RF line as directed by a video input. At the RF output, the phase shifts appear to be random in nature and it is therefore necessary to use a monitoring device for determining whether or not the phase shifter has failed. While various techniques are used to monitor phase shifters, the devices employed are relatively large and complex.

In the present invention, an RF input is applied to a first hybrid coupler and the signal is equally divided between two output arms which are at opposite ends of the coupler. The output signals are 90 electrical degrees out of phase. The outputs from the first hybrid coupler are applied to identical phase shifters and the outputs from these identical phase shifters are applied to a second hybrid coupler. In the second hybrid coupler the one signal that was originally shifted is again shifted 90 electrical degrees so that the RF through the two paths arrives in phase at one output arm but arrives 180 electrical degrees out of phase at the other output arm and cancels. If either one of the two phase shifters fails or operates improperly, cancellation will no longer occur and an output will appear. This output is detected, and then amplified and used to operate an indicator.

It is therefore a general object of the present invention to provide a new and improved device for determining the failure of a phase shifter.

Other objects and advantages of the present invention will be readily apreciated as the same becomes better understood by reference to the following detailed description when considered in connection with the accompanying drawing wherein:

FIGURE 1 is a block diagram showing the use of a phase shifter in the prior art; and FIGURE 2 is a block diagram showing a preferred embodiment of the present invention.

Referring to FIGURE 1 of the drawing, there is shown a phase shifter 11 that has an RF input thereto. A video input is also provided to phase shifter 11 which directs the phase shifter to introduce phase shifts into the RF output. At the RF output, the phase shifts appear to be random in nature and consequently a fault in phase shifter 11 is not readily detectable.

Referring now to FIGURE 2 of the drawing, an RF signal is fed into one arm 12 of a hybrid coupler 13 through waveguide 14. The input signal ($e$) is equally divided between output arms 15 and 16 with the output signals being 90 electrical degrees out of phase. Output arm 15 is connected to a first phase shifter 17 through waveguide 18 and output arm 16 is connected to a second phase shifter 19 through waveguide 21.

Phase shifters 17 and 19 are also coupled to a common video input which causes an identical phase shift in each phase shifter. The output of phase shifter 17 is fed through waveguide 22 into arm 23 of a second hybrid coupler 24 and the output of phase shifter 19 is fed through waveguide 25 into arm 26 of the second hybrid coupler 24. These two inputs to the second hybrid coupler 24 are divided and combine in arms 27 and 28. A waveguide 29 is connected to arm 28 which supplies the RF output, and waveguide 31 connects arm 27 with a detector 32, which by way of example, might be a crystal diode. Any output that is detected is amplified by means of an amplifier 33 and then fed to an appropriate indicating device 34 such as a lamp or scope.

In operation, an RF input ($e$) is fed through waveguide 14 into arm 12 of hybrid coupler 13. The remaining adjacent arm is isolated from the input signal. Input signal ($e$) is equally divided between output arms 15 and 16 with the output signals being 90 electrical degrees out of phase. As shown in FIGURE 2 of the drawing, the signals from the output arms are each $0.7(e)$ with the signal entering waveguide 18 leading the signal entering waveguide 21 by 90 electrical degrees. With phase shifters 17 and 19 working properly, the signals entering therein are shifted an identical amount and consequently the signal entering waveguide 22 still leads the signal entering waveguide 25 by 90 electrical degrees.

In the second hybrid coupler 24, the signal entering arm 23 is equally divided between output arms 27 and 28, and likewise the signal entering arm 26 is equally divided between the two output arms. The two signals in arm 27 are 180 electrical degrees out of phase and cancel one another while the signals in arm 28 are added. This can be shown mathematically as follows:

(a) Signal from arm 23+signal from arm 26 (shifted 90 degrees)=signal in arm 27, or
(b) $0.5e^{\angle 0}+0.5e^{\angle -180}=.5(e-e)=0$; and also
(c) Signal from arm 26+signal from arm 23 (shifted 90 degrees)=signal in arm 29, or
(d) $0.5e^{\angle -90}+0.5e^{\angle -90}=e^{\angle -90}$ Thus with phase shifters 17 and 19 operating properly, there is no output from arm 27 of hybrid coupler 24 and consequently no signal is received by indicator 34. The output from arm 28 is ($e$), which is equal to the RF input ($e$), only shifted 90 electrical degrees. On the other hand, if either one of phase shifters 17 or 19 is not functioning, the phase shifts of the signal will be affected and there will not be a cancellation of signals in arm 27. The signal in arm 27 is detected by detector 32 and then amplified by amplifier 33 and fed to indicator 34.

It can thus be seen that the present invention provides an improved device for indicating a fault in a phase shifter. Obviously many modifications and variations of the present invention are possible in the light of the above teachings. It is therefore to be understood, that within the scope of the appended claim, the invention may be practiced otherwise than as specifically described.

What is claimed is:

A monitoring device for indicating any failures of randomly operated phase shifters comprising:
  first and second identical phase shifters to be monitored,
  phase control means connected to said first and second identical phase shifters for intermittently causing identical phase shifts by said first and second phase shifters,
  an RF signal source, a first hybrid coupler having first and second input arms and first and second output arms, one of said input arms being connected to said RF signal source and said first and second output arms being connected to said first and second phase shifters, respectively,
  a second hybrid coupler having first and second input arms and first and second output arms, said first input arm being connected to said first phase shifter, and said second input arm being connected to said second phase shifter, detector means connected to said first output arm of said second hybrid coupler for detecting a signal output in said first output arm of said second hybrid coupler, and an indicator connected to said detector means for indicating the presence of an output signal in said first output arm of said second hybrid coupler.

References Cited by the Examiner

UNITED STATES PATENTS 2,916,712  12/1959  Artuso _____ 333—73

WALTER L. CARLSON, *Primary Examiner.*

PAUL F. WILLE, *Assistant Examiner.*